United States Patent
Bigus et al.

(10) Patent No.: US 9,767,180 B2
(45) Date of Patent: *Sep. 19, 2017

(54) FLOATING TIME DIMENSION DESIGN

(71) Applicant: International Business Machines Corporation, Armonk, NY (US)

(72) Inventors: Joseph P. Bigus, Hilton Head, SC (US); Leon Gong, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/498,366

(22) Filed: Sep. 26, 2014

(65) Prior Publication Data

US 2015/0012480 A1    Jan. 8, 2015

Related U.S. Application Data

(63) Continuation of application No. 13/796,661, filed on Mar. 12, 2013.

(51) Int. Cl.
*G06F 17/30*    (2006.01)

(52) U.S. Cl.
CPC .. *G06F 17/30592* (2013.01); *G06F 17/30339* (2013.01)

(58) Field of Classification Search
CPC ................................................ G06F 17/30551
USPC .................................................. 707/602, 686
See application file for complete search history.

(56) References Cited

U.S. PATENT DOCUMENTS

| 7,401,321 B2 * | 7/2008 | Sit ....................... G06F 11/3664 |
| | | 714/E11.207 |
| 7,660,823 B2 | 2/2010 | Clover |
| 7,693,941 B2 | 4/2010 | Battat et al. |

(Continued)

OTHER PUBLICATIONS

Fasel, et al., "A Data Warehouse Model for Integrating Fuzzy Concepts in Meta Table Structures", ECBS, 17th IEEE International Conference and Workshops on Engineering of Computer-Based Systems, Mar. 2010, pp. 100-109.

(Continued)

*Primary Examiner* — Aleksandr Kerzhner
*Assistant Examiner* — Ahmed Abraham
(74) *Attorney, Agent, or Firm* — Konrad Raynes Davda & Victor LLP; Janaki K. Davda

(57) ABSTRACT

A method, system, and computer program product for managing time dimension tables are disclosed. In a first aspect, the method comprises providing an intelligent time dimension agent application and optimizing a time dimension table by the intelligent time dimension agent based upon changing data in associated fact tables. In a second aspect, the system comprises a processor and a memory coupled to the processor, wherein the memory includes an application which, when executed by the processor, causes the processor to carry out the steps of the method. In a third aspect, the computer program product comprises a non-transitory computer readable medium having a computer readable program recorded thereon, wherein the computer readable program, when executed on a computer device, causes the computer device to carry out the steps of the method.

6 Claims, 5 Drawing Sheets

(56) References Cited

U.S. PATENT DOCUMENTS

| | | | | |
|---|---|---|---|---|
| 7,890,546 | B2* | 2/2011 | Shah | G06F 17/3046 |
| | | | | 707/803 |
| 7,953,695 | B2* | 5/2011 | Roller | G06F 17/30592 |
| | | | | 707/600 |
| 7,970,728 | B2* | 6/2011 | Honzal | G06F 17/30592 |
| | | | | 707/600 |
| 8,122,038 | B2* | 2/2012 | Handy | G06F 17/30477 |
| | | | | 707/758 |
| 8,311,975 | B1* | 11/2012 | Gonsalves | G06F 17/30592 |
| | | | | 707/606 |
| 8,793,268 | B1* | 7/2014 | Gonsalves | G06F 17/30592 |
| | | | | 707/606 |
| 2006/0253475 | A1 | 11/2006 | Stewart et al. | |
| 2007/0027904 | A1* | 2/2007 | Chow | G06F 17/30592 |
| 2007/0061287 | A1* | 3/2007 | Le | G06F 17/30457 |
| 2007/0294208 | A1* | 12/2007 | Chowdhary | G06F 17/30306 |
| 2010/0250412 | A1 | 9/2010 | Wagner | |
| 2010/0318545 | A1* | 12/2010 | Handy | G06F 17/30477 |
| | | | | 707/759 |
| 2012/0173478 | A1* | 7/2012 | Jensen | G06F 17/30592 |
| | | | | 707/602 |
| 2012/0179713 | A1* | 7/2012 | Stolte | G06F 17/30592 |
| | | | | 707/769 |
| 2012/0265728 | A1 | 10/2012 | Plattner et al. | |
| 2014/0244573 | A1* | 8/2014 | Gonsalves | G06F 17/30592 |
| | | | | 707/606 |
| 2014/0279827 | A1 | 9/2014 | Bigus et al. | |

OTHER PUBLICATIONS

IP.com, "Method for Synchronizing Fact Tables with Multi-Dimensional Merge and Deletion of Outline Members", IPCOM000166524D, Jan. 14, 2008, pp. 1-5.

Preliminary Amendment, Sep. 26, 2014, for U.S. Appl. No. 13/796,661, filed Mar. 12, 2013 by J.P. Bigus et al., Total 5 pp. [57.393 (PrelimAmend)].

Office Action 1, Jan. 16, 2015, for U.S. Appl. No. 13/796,661, filed Mar. 12, 2013 by J.P. Bigus et al., Total 15 pp. [57.393 (OA1)].

Response to Office Action 1, Apr. 16, 2015, for U.S. Appl. No. 13/796,661, filed Mar. 12, 2013 by J.P. Bigus et al., Total 8 pp. [57.393 (ROA1)].

Final Office Action, Jul. 30, 2015, for U.S. Appl. No. 13/796,661, filed Mar. 12, 2013 by J.P. Bigus et al., Total 14 pp. [57.393 (FOA)].

Response to Final Office Action, Oct. 30, 3015, for U.S. Appl. No. 13/796,661, filed Mar. 12, 2013 by J.P. Bigus et al., Total 9 pp. [57.393 (RFOA)].

Office Action 3, Dec. 15, 2015, for U.S. Appl. No. 13/796,661, filed Mar. 12, 2013 by J.P. Bigus et al., Total 17 pp. [57.393 (OA3)].

Response to Office Action 3, Mar. 15, 2016, for U.S. Appl. No. 13/796,661, filed Mar. 12, 2013 by J.P. Bigus et al., Total 9 pp. [57.393 (ROA3)].

Final Office Action 2, Jun. 16, 2016, for U.S. Appl. No. 13/796,661, filed Mar. 12, 2013 by J.P. Bigus et al., Total 20 pp. [57.393 (FOA2)].

Response to Final Office Action 2, Sep. 14, 2016, for U.S. Appl. No. 13/796,661, filed Mar. 12, 2013 by JP. Bigus et al., Total 10 pp. [57.393 (RFOA2)].

Office Action 5, Sep. 28, 2016, for U.S. Appl. No. 13/796,661, filed Mar. 12, 2013 by J.P. Bigus et al., Total 28 pp. [57.393 (OA5)].

Response to Office Action 5, Dec. 21, 2016, for U.S. Appl. No. 13/796,661, filed Mar. 12, 2013 by J.P. Bigus et al., Total 12 pp. [57.393 (ROA5)].

Notice of Allowance, Mar. 16, 2017, for U.S. Appl. No. 13/796,661, filed Mar. 12, 2013 by J.P. Bigus et al., Total 27 pp. [57.393 (NOA)].

* cited by examiner

FLOATING TIME DIMENSION DESIGN

CROSS-REFERENCE TO RELATED APPLICATION

Under 35 U.S.C. 120, this application is a Continuation Application and claims priority to U.S. application Ser. No. 13/796,661, filed Mar. 12, 2013, entitled "FLOATING TIME DIMENSION DESIGN," which is incorporated herein by reference in its entirety.

FIELD OF THE INVENTION

The present invention relates to star schemas, and more particularly, to a method, system, and computer program product for managing time dimension tables.

BACKGROUND

A star schema is a type of data warehouse schema used for reporting data and data analysis. The star schema consists of one or more fact tables referencing any number of dimension tables. A fact table holds metric values recorded for a specific event. A dimension table typically has fewer records compared to a fact table but holds a very large number of attributes that describe the fact data. A data mart is an access layer of the data warehouse environment that is used to get data out to users and different data marts are utilized for different business scenarios.

A time dimension table is essential in OLAP star schema design as it involves time related data. In OLAP star schema design, time related data accounts for approximately 90% of the data collected in OLAP analysis. As a result, a time dimension table is typically the largest type of dimension table and is very expensive to manage utilizing conventional OLAP storage models.

Issues arise when managing time dimension tables using conventional storage models because data in a time dimension table is static and typically generated when the time dimension table is created whereas data in a fact table is dynamic and incrementally grows over time. Additionally, to provide data comparability, a time dimension table with a specific time unit level is shareable among various data marts that have the same specific time unit level. However, because each data mart typically has its own time unit level, data comparability among data marts is limited thereby increasing the size of the time dimension table. Therefore, there is a strong need for a cost-effective solution that overcomes the above issue by efficiently managing and optimizing time dimension tables. The present invention addresses such a need.

SUMMARY OF THE INVENTION

A method, system, and computer program product for managing time dimension tables are disclosed. In a first aspect, the method comprises providing an intelligent time dimension agent application and optimizing a time dimension table by the intelligent time dimension agent based upon changing data in associated fact tables.

In a second aspect, the system comprises a processor and a memory coupled to the processor, wherein the memory includes an application which, when executed by the processor, causes the processor to provide an intelligent time dimension agent application and optimize a time dimension table by the intelligent time dimension agent based upon changing data in associated fact tables.

In a third aspect, the computer program product comprises a non-transitory computer readable medium having a computer readable program recorded thereon, wherein the computer readable program, when executed on a computer device, causes the computer device to provide an intelligent time dimension agent application and optimize a time dimension table by the intelligent time dimension agent based upon changing data in associated fact tables.

BRIEF DESCRIPTION OF THE DRAWINGS

The accompanying figures illustrate several embodiments of the invention and, together with the description, serve to explain the principles of the invention. One of ordinary skill in the art will recognize that the embodiments illustrated in the figures are merely exemplary, and are not intended to limit the scope of the present invention.

DETAILED DESCRIPTION

The present invention relates to star schemas, and more particularly, to a method, system, and computer program product for managing time dimension tables. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown but is to be accorded the widest scope consistent with the principles and features described herein.

A method, system, and computer program product in accordance with the present invention manages and optimizes time dimension tables. By utilizing a floating time dimension (FTD) architecture, time dimension tables of a star schema automatically adjust to time information changes in associated fact tables of the star schema and maintain a minimum time dimension table size. The floating time dimension design supports multiple data mart time unit levels thereby enabling data comparability among a plurality of data marts of the star schema.

To describe the features of the present invention in more detail, refer now to the following description in conjunction with the accompanying Figures.

Figure 1:
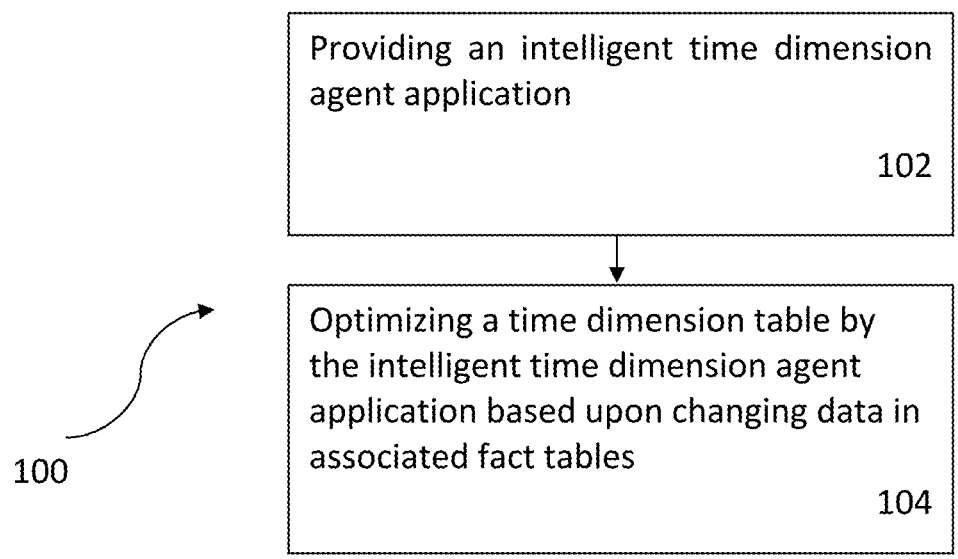
FIG. 1 illustrates a method for managing time dimension tables in accordance with an embodiment.

FIG. 1 illustrates a method 100 for managing time dimension tables in accordance with an embodiment. The method 100 comprises providing an intelligent time dimension agent application, via 102, and optimizing a time dimension table by the intelligent time dimension agent application based upon changing data in associated fact tables, via 104.

In one embodiment, the step of optimizing a time dimension table further comprises creating a floating time dimension (FTD) to automatically adjust the time dimension table based on the time information changes in the associated fact tables, wherein the FTD is managed by the intelligent time dimension agent application.

In this embodiment, the components of the FTD include but are not limited to a set of time dimension tables associated with a set of fact tables, a time dimension agent (TDA) application, a root time dimension table, a root time dimension agent application, a child time dimension table, and a child time dimension agent application. Furthermore, in this embodiment, the TDA automatically manages the set of time dimension tables by creating and modifying each time dimension table, generating and modifying data of each time dimension table, and communicating with other time dimension agents (root and child).

Figure 2:
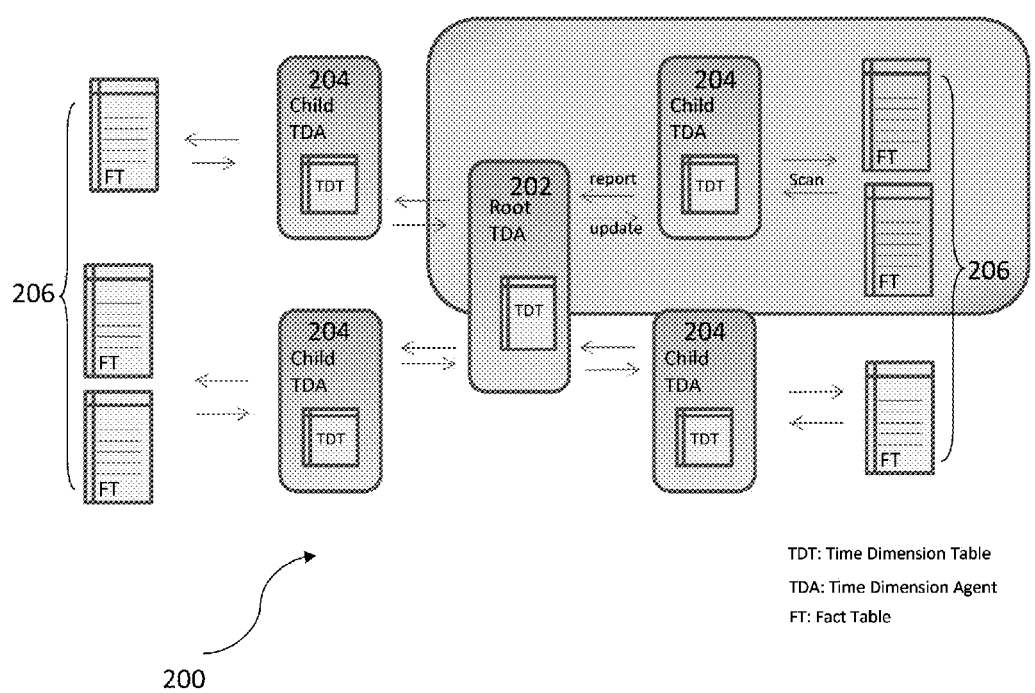
FIG. 2 illustrates a floating time dimension (FTD) in accordance with an embodiment.

FIG. 2 illustrates a floating time dimension (FTD) 200 in accordance with an embodiment. The floating time dimension (FTD) 200 includes a root time dimension agent 202 that interfaces with a plurality of child time dimension agents 204 regarding data changes associated with a plurality of fact tables 206. The root time dimension agent 202 is associated with a root time dimension table and each of the plurality of child time dimension agents 204 are associated with a child time dimension table.

Referring back to FIG. 1, in one embodiment, the method 100 includes supporting multiple data mart time unit levels to enable data comparability among a plurality of data marts and covering the plurality of data marts by the root time dimension table. The root time dimension table includes a lowest time unit level for the plurality of data marts and a time key for the multiple data mart time unit levels.

The method 100 includes managing the root time dimension table by the root time dimension agent. In one embodiment, at least one of the associated fact tables includes the child time dimension table and the child time dimension table scans data of the at least one of the associated fact tables to determine a time frame and a time unit level of the at least one of the associated fact tables.

The created floating time dimension (FTD) represents a set of time dimension tables within a star schema and is managed by at least one intelligent time dimension agent application. The at least one intelligent time dimension agent application manages the FTD based on changing data in a set of fact tables associated with the set of time dimension tables. The FTD ensures that time frame coverage of the set of time dimension tables reflects time information changes in the set of fact tables.

Additionally, the FTD supports data comparability among a plurality of data marts by enabling a unified time key for all of the plurality of data marts, including data marts that have different time unit levels. By analyzing the changing data of the set of fact tables associated with the set of time dimension tables, a reasonably and intelligently small sized time dimension table is achieved for each data mart of the plurality of data marts.

The time dimension agent (TDA) application component of the floating time dimension (FTD) automatically manages a particular time dimension table of the set of time dimension tables. The TDA application carries out a plurality of services including but not limited to time dimension table creation and modification, data generation and modification, and communication with other time dimension agents.

The root dimension table component of the floating time dimension (FTD) covers the time related data and information of all of the plurality of data marts with a predetermined margin. The size of the margin depends on how quickly the fact tables change and grow, and consequently how often the associated time dimension tables need to be updated. The root dimension table includes a lowest time unit data for all of the plurality of data marts and a unified time key for multiple levels of data mart time units. The root dimension table is managed by a root time dimension agent application.

The child dimension table component of the floating time dimension (FTD) is a view or a materialized view against the root time dimension table. A materialized view (also known as a snapshot) is a database object that contains the results of a query and is used to improve performance. Every fact table within the set of fact tables associated with the set of time dimension tables includes a particular child dimension table that can be shared and utilized by more than one fact table. A child dimension agent application dynamically updates the particular child time dimension table based upon data changes in its associated fact table.

In one embodiment, a root time dimension agent application scans all fact tables within a set of fact tables associated with a set of time dimension tables to determine a time frame and a lowest time unit that entirely covers all of the time related data of the set of fact tables. The set of fact tables are accessed by a plurality of data marts. The root time dimension agent application generates a root time dimension table that includes time related data that covers and represents all of the time related data within the set of fact tables with a 20% forward margin. The generated root time dimension table defines the finest granularity, or smallest time unit of the set of fact tables and key data fields for all time unit levels of the set of fact tables.

In this embodiment, each of a plurality of child time dimension agent applications scan data in an associated target fact table within the set of fact tables to determine a time frame and a time unit level of the associated target fact table. Based on this determined information, each child time dimension agent application generates a child time dimension table related to the associated target fact table that is either a view or a materialized view (snapshot) based upon performance requirements.

The data populated in each child time dimension table covering a specific associated fact table is also associated with the data covering all fact tables within the set of fact tables that is populated in the root dimension table. Each child time dimension table covers only its associated target fact table with a forward margin that depends on the nature of the associated target fact table data. The forward margin represents a temporal growth margin, used as a predetermined buffer, and is typically set to a 10% to 20% range of values past the current time dimension table end date.

In this embodiment, each child time dimension agent application monitors time related information in its associated target fact table. When data in its associated fact table reaches or is near the predetermined buffer of the child time dimension table, the child time dimension agent application is triggered to regenerate the child time dimension table. Additionally, when the child dimension table reaches or is near a predetermined limit of the root time dimension table, the child time dimension agent application notifies the root time dimension agent application to regenerate the root time dimension table.

In this embodiment, the root time dimension agent application calculates time key shift values for all time unit levels of the set of fact tables. The root time dimension agent application regenerates the root time dimension table and broadcasts and relays the time key shift values to all of the plurality of child time dimension agent applications, thereby enabling the plurality of child time dimension agent applications to also update the associated time key values during the regeneration of each child time dimension table based upon changes to time related data of the set of fact tables.

Figure 3:
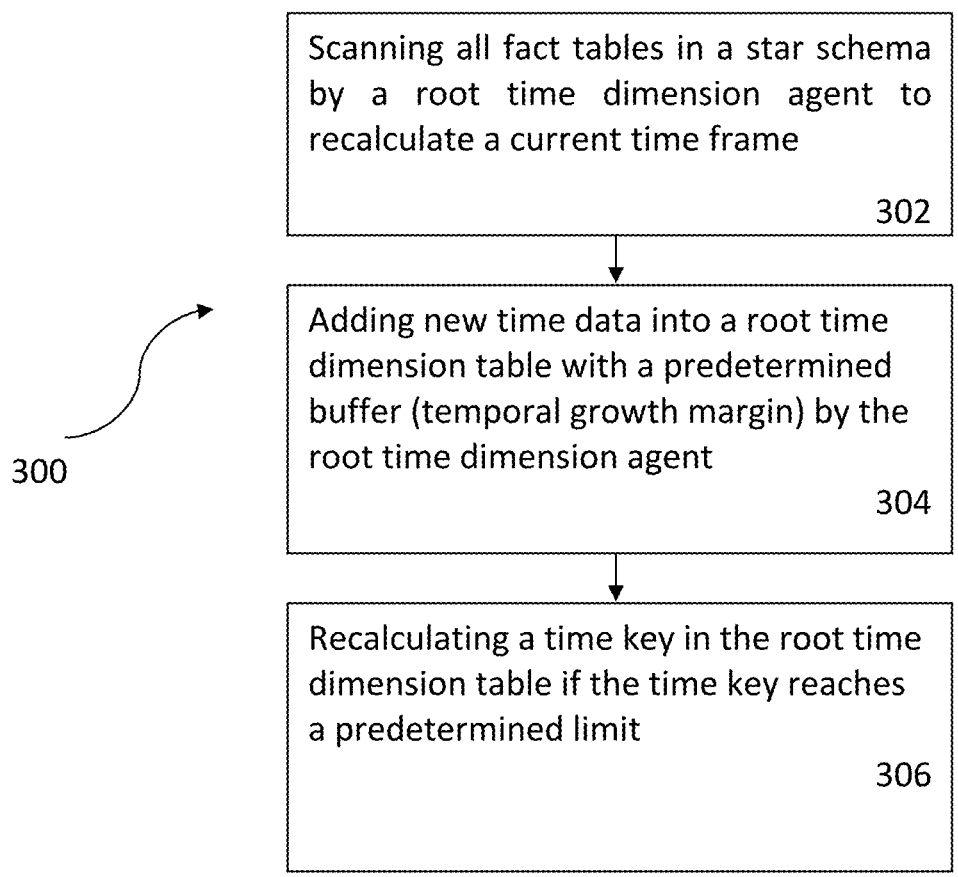
FIG. 3 illustrates another method for managing time dimension tables in accordance with an embodiment.

FIG. 3 illustrates another method 300 for managing time dimension tables in accordance with an embodiment. In one embodiment, the time dimension tables are part of a star schema design and support various fact tables. The method 300 converts a traditional static time dimension to an intelligent and dynamic time dimension agent application that manages and periodically optimizes a time dimension table based on changing data in the supported fact tables.

The method 300 includes a root time dimension agent that scans all the various fact tables to recalculate a current time frame, via 302, and that adds new time data into a root time dimension table with a predetermined buffer (temporal growth margin), via 304. The method 300 includes recalculating a time key in the root time dimension table if the time key reaches a predetermined limit, via 306. The predetermined limit is monitored by root or child time dimension agents detecting that fact table data has grown into a margin area which triggers an update to a time dimension table associated with the root or child time dimension agents.

Figure 4:
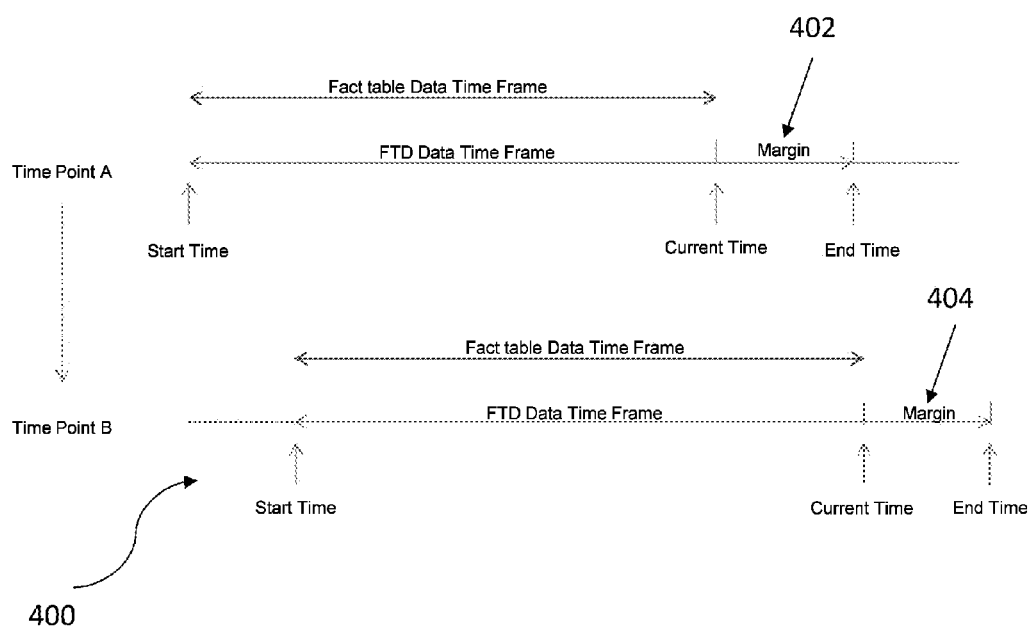
FIG. 4 illustrates a diagram of the evolution of a fact table and associated time dimension table in accordance with an embodiment.

FIG. 4 illustrates a diagram 400 of the evolution of a fact table and associated time dimension table in accordance with an embodiment. At time point A, a root or child time dimension agent scans a fact table to get a data time frame. The time dimension agent creates an associated time dimension table and populates the associated time dimension table with time related data that covers the fact table plus a forward margin 402. The forward margin 402 is calculated based on a variety of factors including but not limited to how fast the fact table is updated and how often the associated time dimension table needs to be updated.

At time point B, the time related data in the fact table reaches a predetermined threshold, which is a short time before the "end time" of time point A. The time dimension agent detects that the predetermined threshold has been reached and adds new data to the associated time dimension table, which is equal to the length of a forward margin 404.

In one embodiment, it is assumed that the fact table only contains data of a fixed time frame. Therefore, as new data is added to the end of the fact table on a predetermined basis (e.g. daily), old data is removed from the beginning of the fact table. Additionally, at time point B, when the forward margin 404 of new time related data is added to the associated time dimension table, old time related data is removed from the associated time dimension table to reflect data changes in the fact table. As contents of the fact table change and move through time, the size of the associated time dimension table is kept relatively constant.

In one embodiment, where multiple star schemas are utilized, the method 300 includes a set of child time dimension agents, wherein each child time dimension agent is associated with and manages at least one child time dimension table. Each child time dimension agent calculates time frames of a particular child time dimension table and reloads the particular child time dimension table by extracting data from the root time dimension table. Furthermore, each child time dimension agent notifies the root time dimension agent that the particular child time dimension table is updated to enable the removal of older and unneeded data from the root time dimension table.

In one embodiment, child time dimension agents capture data changes in associated fact tables and then inform a root time dimension agent of the data changes. Next, the root time dimension agent adds new time data into a root time dimension table with a reasonable buffer and informs the child time dimension agents of the data changes in the root time dimension table. If the time key reaches a predetermined limit, a time key of the root dimension table is recalculated.

As above described, the method and system in accordance with the present invention allow for managing and optimizing time dimension tables within a star schema including associated fact tables. By utilizing an intelligent time dimension agent application to manage a floating time dimension (FTD), a time dimension table is automatically adjusted/dynamically updated based on time information changes in an associated fact table to achieve cost-effective time dimension table optimization. Specifically, as data in associated fact tables moves through time, the time dimension tables are updated by removing records that represent no longer referenced early time periods. Furthermore, the time dimension tables are extended to the last referenced time period plus a temporal growth margin of time records.

A method, a computer system, and a computer program product for managing time dimension tables have been disclosed. As will be appreciated by one skilled in the art, aspects of the present invention may be embodied as a method, system, or computer program product. Accordingly, aspects of the present invention may take the form of an entirely hardware embodiment, an entirely software embodiment (including firmware, resident software, micro-code, etc.) or an embodiment combining software and hardware aspects that may generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer ore entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein and below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instruction stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart illustrations and block diagrams in the Figures illustrate the architecture, functionality, and operation of possible implementations of methods, systems and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Figure 5:
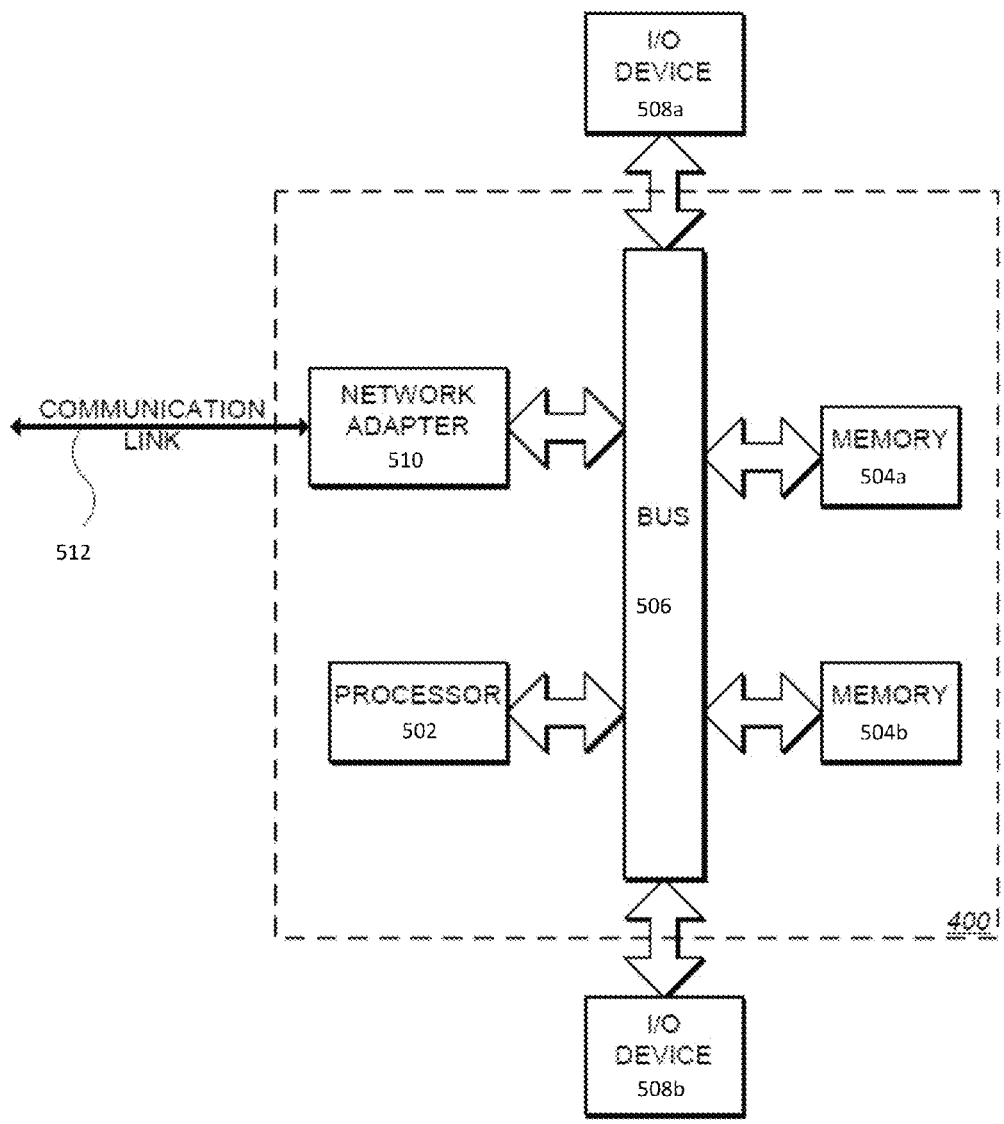
FIG. 5 illustrates a data processing system suitable for storing the computer program product and/or executing program code in accordance with an embodiment.

FIG. 5 illustrates a data processing system 500 suitable for storing the computer program product and/or executing program code. The data processing system 500 includes a processor 502 coupled to memory elements 504a-b through a system bus 506. In other embodiments, the data processing system 500 may include more than one processor and each processor may be coupled directly or indirectly to one or more memory elements through a system bus.

Memory elements 504a-b can include local memory employed during actual execution of the program code, bulk storage, and cache memories that provide temporary storage of at least some program code in order to reduce the number of times the code must be retrieved from bulk storage during execution. As shown, input/output or I/O devices 508a-b (including, but not limited to, keyboards, displays, pointing devices, etc.) are coupled to the data processing system 500. I/O devices 508a-b may be coupled to the data processing system 500 directly or indirectly through intervening I/O controllers (not shown).

In FIG. 5, a network adapter 510 is coupled to the data processing system 500 to enable data processing system 500 to become coupled to other data processing systems or remote printers or storage devices through communication link 512. Communication link 512 can be a private or public network. Modems, cable modems, and Ethernet cards are just a few of the currently available types of network adapters.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for managing time dimension tables, the method comprising:

optimizing a time dimension table based upon changing data in associated fact tables and using a floating time dimension (FTD) that comprises a root time dimension agent that interfaces with a plurality of child time dimension agents, wherein the root time dimension agent is associated with a root time dimension table and each of the plurality of child time dimension agents is associated with a child time dimension table corresponding to a fact table from the associated fact tables, by:

in response to determining, with a child time dimension agent of the plurality of child time dimension agents, that data in the corresponding fact table is near a predetermined buffer of the associated child time dimension table, regenerating the child time dimension table; and in response to determining, with the child time dimension agent, that the associated child time dimension table is near a predetermined limit of the root time dimension table, notifying, with the child time dimension agent, the root time dimension agent to regenerate the root time dimension table;

calculating, with the root time dimension agent, time key shift values for time unit levels of the associated fact tables to regenerate the root time dimension table; and updating, with each of the plurality of child time dimension agents, time key values during regeneration of an associated child time dimension table based on the time key shift values.

2. The method of claim 1, further comprising:
supporting multiple data mart time unit levels to enable data comparability among a plurality of data marts.

3. The method of claim 1, further comprising:
creating the floating time dimension (FTD) to automatically adjust the time dimension table based on time information changes in the associated fact tables, wherein the FTD is managed by an intelligent time dimension agent application.

4. The method of claim 3, further comprising:
automatically managing each child time dimension table by creating and modifying the child time dimension table, generating and modifying data of the child time dimension table, and communicating with other child time dimension agents.

5. The method of claim 4, further comprising:
covering a plurality of data marts by the root time dimension table, wherein the root time dimension table includes a lowest time unit level for the plurality of data marts and a time key for multiple data mart time unit levels; and
managing the root time dimension table by the root time dimension agent.

6. The method of claim 5, further comprising:
scanning data of the corresponding fact table with the child time dimension agent to determine a time frame and a time unit level.

* * * * *